INVALID MOBILITY DEVICE

Original Filed Jan. 20, 1967 3 Sheets-Sheet 1

INVENTORS
Arthur Schwartz
Frederick L. Day

BY Arthur Schwartz
ATTORNEY

INVALID MOBILITY DEVICE

Original Filed Jan. 20, 1967 3 Sheets-Sheet 2

INVENTORS
Arthur Schwartz
Frederick L. Day

BY Arthur Schwartz
ATTORNEY

INVALID MOBILITY DEVICE

Original Filed Jan. 20, 1967 3 Sheets-Sheet 3

INVENTORS
Arthur Schwartz
Frederick L. Day

BY Arthur Schwartz
ATTORNEY

United States Patent Office

Re. 28,103
Reissued Aug. 6, 1974

28,103
INVALID MOBILITY DEVICE

Arthur Schwartz, 14 Wilelinor Drive, Edgewater, Md. 21037, and Frederick L. Day, Washington, D.C.; said Day assignor to said Schwartz

Original No. 3,463,146, dated Aug. 26, 1969, Ser. No. 610,627, Jan. 20, 1967. Application for reissue Oct. 6, 1972, Ser. No. 295,520

Int. Cl. A61h *1/02*

U.S. Cl. 128—25 R 19 Claims

Matter enclosed in heavy brackets [ ] appears in the original patent but forms no part of this reissue specification; matter printed in italics indicates the additions made by reissue.

ABSTRACT OF THE DISCLOSURE

A device for raising and lowering a partially paralyzed person from a seated to a substantially standing position and moving the person in a standing position along a substantially transverse direction. Motive means for raising the person and additional motor means for moving the person in a plurality of directions along the surface.

Background and objects

It is well recognized in the medical field that there are definite therapeutic advantages in positioning a paraplegic, quadraplegic or other partially paralyzed persons in a substantially standing position. Besides the psychological aspects of raising a substantially paralyzed individual from a wheelchair to a vertical motive position, physiological changes can occur in the body especially in the legs, if vertical positioning is discontinued for long periods of time. Further, standing of the paraplegic or quadraplegic is beneficial not only for the bones and muscles, but also for proper functioning of the bladder and other internal organs.

Various types of tilt-tables and the like have been devised to accustom an individual to being raised from a horizontal to a standing position. Even with special leg braces, and the like, usually two strong persons must be available to safely raise and maintain a quadraplegic on a tilt board.

Many of these advantages, together with a number of others recognized in the profession, have been set out in a device called the Kim Self-Stander for wheelchair patients, published in the Archives of Physical Medicine and Rehabilitation, volume 42, August 1961, pages 599–601. These and other devices for raising the paraplegic and quadraplegic have been bulky and do not provide the mobility of a wheelchair, nor do they provide access to places where normally paraplegics and quadraplegics would be unable to go. The medical and therapeutic journals are replete with means and reasons for standing the partially paralyzed.

A quadraplegic with injuries to the fifth and sixth cervical vertebrae requires a great deal of help from attendants. Certain paraplegics usually must be bodily lifted from their wheelchair onto a bed or toilet, for example.

It is therefore an object of the instant invention to mechanically raise a partially paralyzed person from a sitting to a standing position with only the slightest movement of a universally pivoted switch member or the like. The amount the individual is raised is easily regulated. The individual may then propel himself through other motor means to his desired location and reseat himself with little or no aid. The device is also advantageous in helping a muscularly weak patient to accustom himself to walking. At some date in the therapy the propelling means can be disconnected and removed.

It has been found that by modifying a power actuated crutch of the type set out in Patent No. 3,157,188 and Patent No. 3,157,189 to George R. Farnham, together with geared-down motors, the above desired movement may be achieved.

Summary of the invention

One form of the invention includes a pair of power actuated crutches which are controllable by means of a universally pivoting switch on one handle. These crutches may be mounted on a base or a pair of bases which may be joined by universally pivoting ball joints and rod means. The bases are driven by motors which are geared down in a manner conventional with wheelchair drives and the like.

Brief description of the drawings

The foregoing and other objects, features and advantages of the invention will become more apparent from the following detailed description and accompanying drawings wherein:

FIGURE 8 is a schematic view showing the device of FIGURES 1–5, for example, wherein one crutch is shortened so as to move up a step or the like.

Detailed description of crutches

Figure 1:
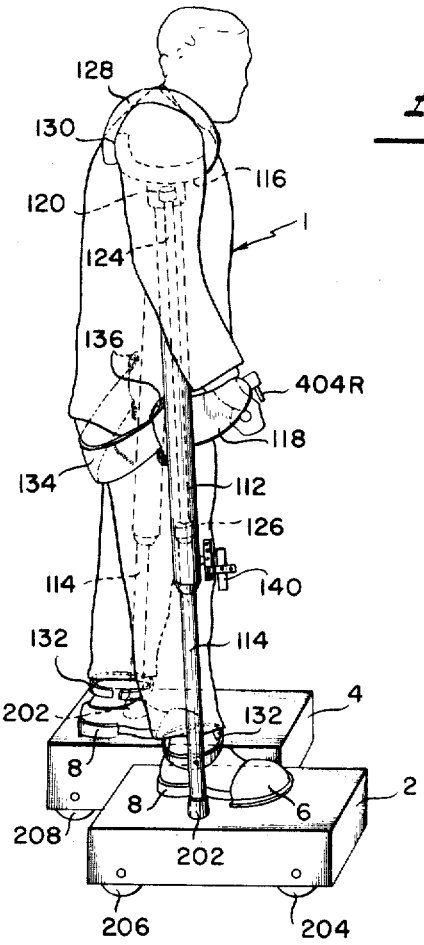
FIGURE 1 is a perspective elevation view of a patient mounted on one form of the device in a standing position.

Referring now to the drawings, particularly FIGURE 1, a patient 1 is seen in a standing position. Each of his feet is placed on a first base 2 and a second base 4. This may be done by placing the foot in a foot receiving member or foward portion of a slipper-type member 6, while the heel portion of the foot rests in a support means 8. The supports may be better seen in detail from FIGURES 3 and 4. If "walking," as discussed below, is not desired, members 2 and 4 can be made of one support.

It will be noted that various means may be utilized for adjusting the foot size to the individual patient, for example bolts 10 may be used to adjustably move the heel member in openings 12 in the bases 2 and 4.

Also, obviously the entire shoe may be built onto the base, or even attached by a ski binding-type arrangement.

Figure 3:
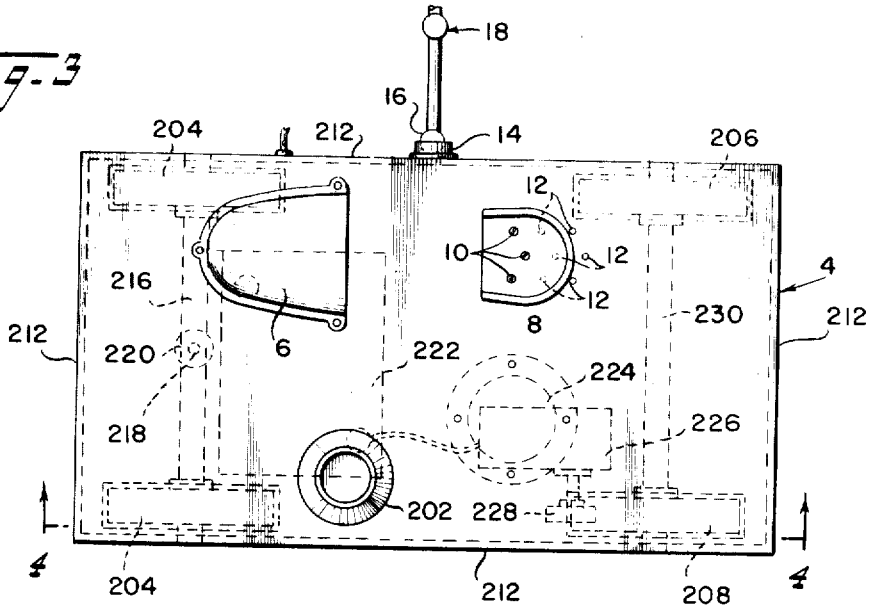
FIGURE 3 is a plan view of one of the base members.
Figure 8:
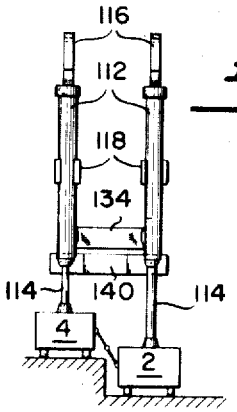
Figure 9:
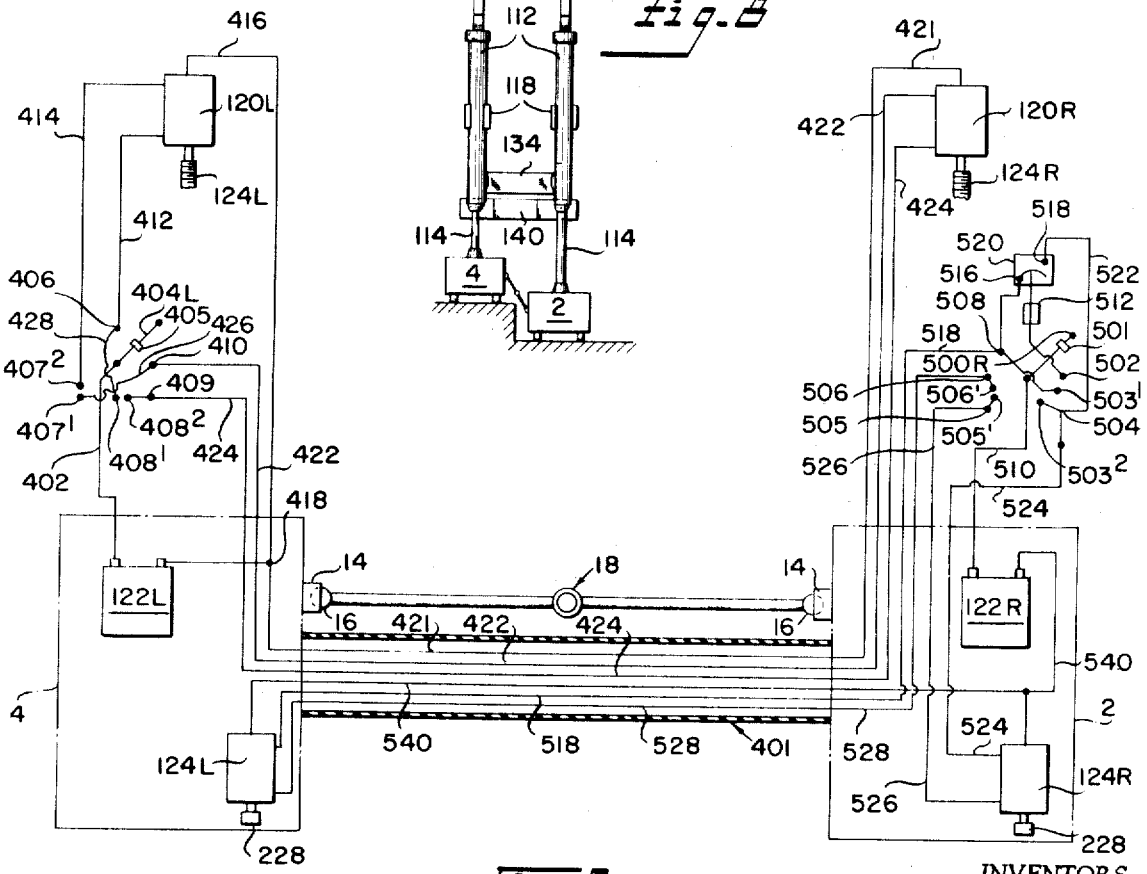
FIGURE 9 is a schematic view of the electrical system for controlling the device.

As seen for example in FIGURES 8 and 9, and partially in FIGURE 3 the two base members may be connected together by ball and socket joint couplings. A pair of sockets 14 are seen mounted on each of the bases with a pair of conventional ball members 16 mounted therein. A universally pivoted ball and socket joint 18 provides additional movement so that the two members will be limited in their spreading effect, yet will not be limited in their forward, rearward or up and down movement relative to each other. This movement will be controlled by the motors and electrical system seen below.

Figure 2:
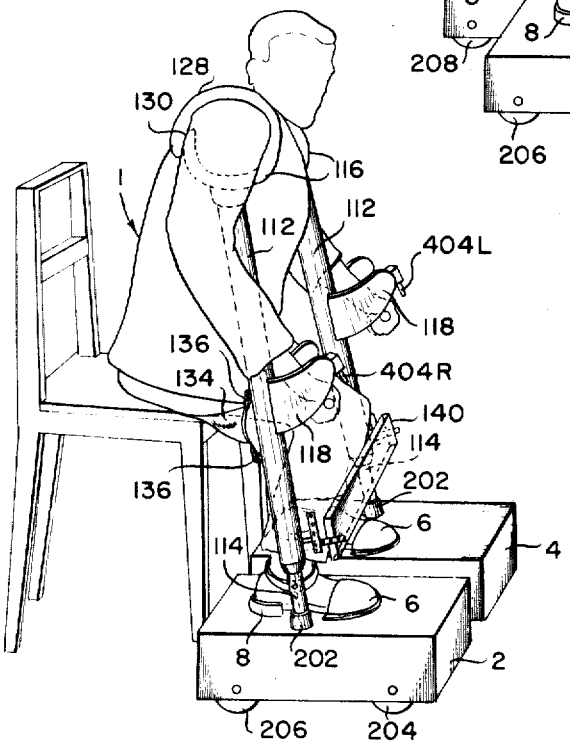
FIGURE 2 is a perspective view of the patient in a seated position while on the device.

As disclosed in the Farnham type crutch and with reference to FIGURES 1 and 2, a pair of telescoping body sections 112 and 114 have an armrest 116 mounted thereon. A conventional handhold assembly 118 is seen attached to portion 112. Disposed in the body section 112 is reversible electric motor 120. The inventor of the Farnham crutch has used a motor furnished by Black & Decker Mfg. Company of Towson, Md. The motor in that patent being housed in a physically, cylindrically formed passage which is approximately 3/16" long and has an outer diameter of approximately 1¾". Of course, a small conventional motor with reduction gears even of the type used in other types of devices may be used, or also hydraulic actuated devices as in the other Farnham patent. Attached to the motor 120 is a threaded shaft 124 which has a simple threaded nut 126 in which it engages. The nut 126 is attached to the lower section 114. The remainder of the crutch is conventional except as set out below.

The crutch armpit rest 116 include a band 128 which goes over the shoulder of the patient. This is attached to the front portion of 116 and may be secured by conventional means to the rearward portion of the armpit rest. One example is the use of cooperating "Velcro" portions at the juncture 130. This makes it easy for removal yet provides the necessary strength. Of course a buckle or snap means is possible.

The legs of the patent are secured to the crutch by means of leg bands 132 which may also be buckled or may use "Velcro."

A sling 134 is connected to the upper portion 112 of each of the crutches, and engages the buttocks of the patient. This connection may be in any conventional manner as seen at 136. One example is hook means which are easily disengaged.

As will be pointed out below, the handhold means may be conventional or even house batteries as in Patent No. 3,157,189 and are each provided with universally pivoting switches. One switch as indicated above operates the crutch and the other operates the motivation or drive motors of the bases 2 and 4.

The exact construction of the type of telescoping crutch member will be obvious to one with ordinary skill in the art, particularly with reference to the Farnham patents.

Figure 10:
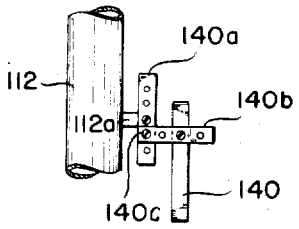
FIGURE 10 is a detail of one form for adjusting a knee brace.

If the combination of the foot support 6, the leg straps 132, the sling 134 and the armpit rest 116 is not sufficient to maintain the paraplegic in the upright position, an additional boardlike member 140 may be secured to the two crutches. Therefore, since the board member 140 is attached to the upper section of the crutch 112, it will slowly rise as the patient is lifted and will form a fulcrum and support as he rises and brace the knees when he is in the standing position. This will entirely do away with the need for braces. As an alternative, the board 140 may only come into play when the crutch is in the extended position. Thus, merely acting the part of a brace and not a fulcrum to assist in rising. Therefore, the size and shape of board 140 will conform with the needs of the particular patient, and should be adjustable. This adjustment is exemplified in FIGURE 10 wherein connection 112a is attached to member 112. An apertured member 140a is attached to 112a while a cooperating aperture member 140b is attached to brace 140. The two are variably connected through a conventional bolt 140c.

The crutches may be mounted in either a rigid manner as seen at 202 in the various figures, for example, by screwing them into the member 202 or by means of very limited ball joint movement so that the device can properly be leaned rearward. This rearward leaning of the crutch is primarily dependent upon how far forward the patient is able to slide in his chair or wheelchair and the extent to which the bases 2 and 4 slide under the wheelchair or the like. The leaning movement is actually exaggerated in FIGURE 2. Also, the crutches may be mounted more rearwardly on the supports 2 and 4. The crutches should also be detachable so that they may be used without the propelling means if possible.

Relative movement of crutches on the supports

As seen in FIGURE 8, if the patient's shoulders, back and legs are strong enough, and small enough batteries and other materials are used, the patient may actually walk up one stair at a time by raising and lowering an individual crutch at a specific time.

Figure 4:
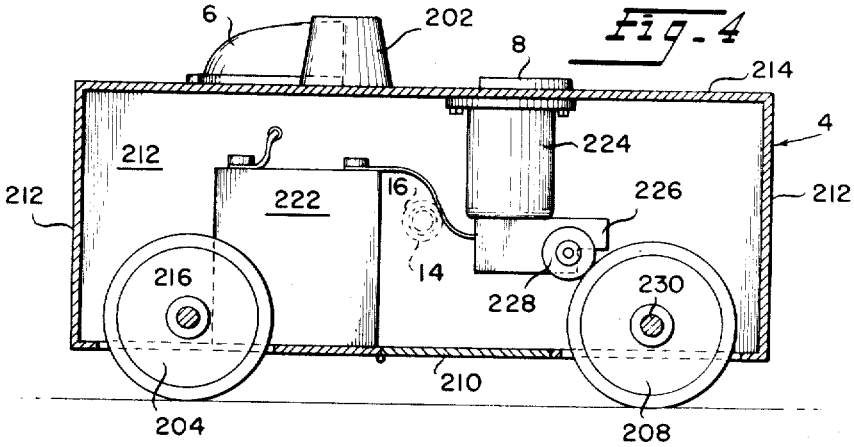
FIGURE 4 is a cross-sectional side elevation view of FIGURE 3 taken along lines 4—4.

With particular reference to FIGURES 3 and 4, a pair of forward wheels are seen at 204 and a pair of rearward wheels 206 and 208 are seen attached to the body members 2 and 4. The support 4, for example, includes a base 210, sides 212 and a top 214. The front wheels 204 include an axle 216 which is pivoted at point 218 to a suitable support 220 so that they may turn. These wheels 204 may actually be smaller and/or much closer together.

A battery 222 is seen connected to a conventional motor 224 having reduction gear means 226 and wheel engaging means 228. When the motor is operating, of course, motion is imparted to the wheel 208 which is connected to wheel 206 through an axle 230. This is quite similar to the operation of a wheelchair motor. The battery shown is of the size of an automobile or wheelchair type. However, smaller batteries of the newly developed types may be used. Also, small motors are possible with wheels smaller than the ordinary wheelchair.

Figure 5:
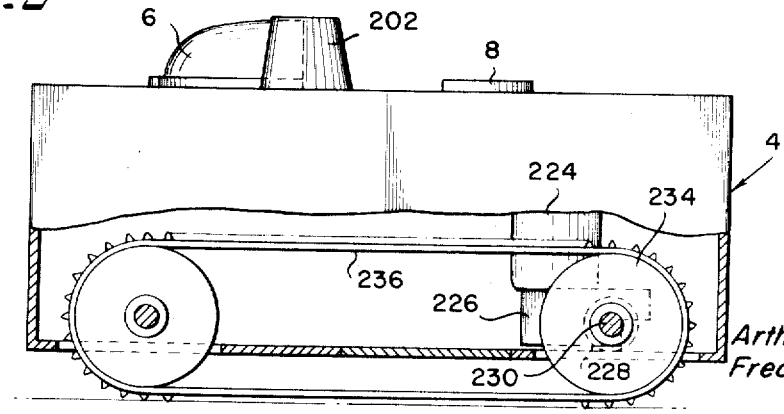
FIGURE 5 is a side elevation view taken partly in cross-section of another form of the invention.

Endless tread modification of FIGURE 5

FIGURE 5 is quite similar to the embodiment of FIGURE 4 except that in place of the engagement of the friction gear element transmitting means 228, the motor is directly attached through the reduction gear to the axle 230 having a sprocket means or the like 234 attached thereto and an endless tread member 236 connected in the usual manner. In this fashion by energizing one or the other of the motors the device will turn in a manner similar to tanks, construction equipment and the like.

By energizing both motors simultaneously, the two bases or one large support will move together.

Ground effect modifications

Figure 6:
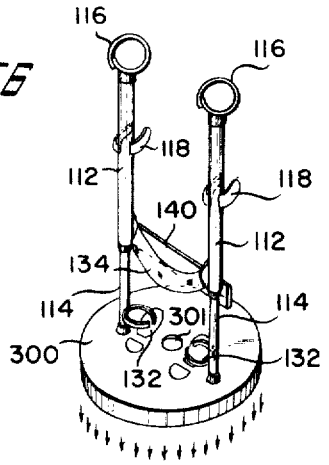
FIGURE 6 is a modification of the invention utilized with a ground effect type base.
Figure 7:
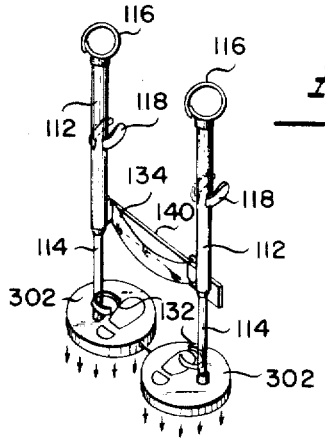
FIGURE 7 is a modification of FIGURE 6 utilizing a pair of bases.

The embodiments in FIGURES 6 and 7 disclose ground effect type devices 300 and individual type devices 302 having their own motor and fan propelling means 301 which is commonly known in the art. An example of such a device is shown in Beardsley Patent No. 3,216,518. These may be steered by leaning from one side to the other utilizing a ball member or wheel member behind the center of gravity as shown in the Beardsley patent or by means of directing a force of air or jet of gas in a particular direction. These are all common expedients known in the art. Also, a combination of air and wheels may be used.

Electrical circuit and motor control system

Referring now to FIGURE 9, the supports 2 and 4 are connected not only by means of the ball and socket means 14–18 but by also a flexible cable 401. As discussed below, this cable 401 contains the electrical means between the universally operated switches.

Also, it will be noted that the devices dealing with the lefthand crutch and support are denoted by the letter L and the righthand members by the letter R for easy identification of the location of the parts.

Connected to one terminal of the battery 122L is a line 402. This connects to the universally movable joy stick or switch member 404L having a bridging member 405 thereon. The switch member 404L may contact a plurality of stationary contacts 406–410.

Contact 406 connects through line 412 to the reverse winding of motor 120L, while a contact 407² connects through line 414 to the forward winding of the motor 120L. A ground line 416 connects to a terminal 418 which in turn connects to the junction 118 through the flexible cable 401 to the ground of the crutch 120R.

A line 422 connects to the reverse winding of the right-hand crutch motor 120R through a terminal 410. A line 424 connects to the reverse winding of 120R through the flexible coupling 401 to the contact 409.

A line 426 connects contacts 407[1] and 410 while a line 428 connects contacts 406 and 408[1].

Operation of crutch control mechanism

By moving the universally operable joy stick 404L to the various contacts 406–410 the crutch may be made to raise and lower. For example, by moving 404L to contact 406 the crutch motor 120L will operate in reverse, thus lower the left crutch. By moving bridging member 405 to contact 407[1] and 407[2] current will flow through line 414 and operate both crutch motors in a forward direction.

If the movable contact 404L is moved to contact 410 current will flow through line 422 to cause motor 120R to operate that crutch in a forward direction. If the contact 404 is moved to contact 409, current will flow through line 424 to the reverse winding of motor 120R. Thus, it will be seen that by the above moving of a conventional universally pivotal switch the crutches may be operated separately. This is similar to methods of operating individual pairs of wheelchair motors. If both crutch motors 120L and 120R are desired to operate in a forward direction, then bridging contact 405 will move to complete the circuit in switch 407[1] and 407[2]. If the motors are desired to operate in reverse, then the contact 405 will be moved to contacts 408[1] and 408[2].

Description and operation of propulsion motors control

A similarly constructed universally pivoted contact 500R is movable between contacts 502, 503[1], 503[2], 504, 505, 505[1], 506, 506[1], and 508. A line 510 connects one pole of the battery 122R to the universally movable contact 500R having a bridging member 501 thereon. When contact 501 is connected to a stationary contact 502, current will flow through variable resistance or other speed control means 512, contact 516 to stationary contact 508 and through line 518 to the forward winding of drive motor 124L. When a bi-metal element 520 heats up, it will contact stationary contact 518 which will send current through line 522, stationary contact 504 to the forward winding of motor 124R through line 524.

If instead member 501 bridges stationary contacts 503[1] and 503[2], current will again flow through 524 and to contact 508 and line 518 so that both motors 124R and 124L will operate in a forward direction.

The bridging of contact 505 will carry current through a line 526 to the reverse winding of motor 124R. Likewise, the bridging of a contact 506 will send current through a line 528 to the reverse winding of motor 124L.

By bridging closely spaced contacts 505[1] and 506[1] both motors 124L and 124R through contact 505 and 506 and lines 526 and 528, respectively, will energize both motors in a reverse direction.

A line 540 connects the propelling motors to a common ground.

Of course, the above is only a schematic showing of one mode of motor operation. Others may be seen in general in the electric wheelchair art, e. g., Rosenthal Patent Nos. 2,798,565 and 3,100,547.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

What is claimed is:

1. A device comprising:

(a) *a buttocks supporting means,* means for raising and lowering a person *supported on said buttocks supporting means* from a first substantially seated position to a second substantially standing position, *said raising and lowering means including a pair of body members each having power means therein, and*

(b) mechanical means for propelling said device along a surface.

[2. A device as defined in Claim 1 wherein said raising and lowering means includes means for supporting the buttocks.]

3. A device [as defined in Claim 1 including] *comprising*:

(a) a pair of raising and lowering means *for raising and lowering a person from a first substantially seated position to a second substantially standing position* and means for selectively raising and lowering said pair separately or simultaneously, and (b) *mechanical means for propelling said device along a surface.*

4. A device as defined in Claim 1 including means for bracing a person's knees.

5. A device [as defined in Claim 1 including] *comprising*:

(a) *means for raising and lowering a person from a first substantially seated position to a second substantially standing position, and*

(b) a pair of *individual foot supporting means, each having a mechanical* propelling means *for propelling the device along a surface.*

6. A device as defined in Claim 1 including means for moving said propelling means over a cushion of air between said propelling means and a surface.

7. A device as defined in Claim 1 including at least one motor means for regulating the direction of movement of said device.

8. A device as defined in Claim 5 wherein said raising and lowering means may selectively raise and lower at least one of said pair of propelling means.

9. A device as defined in Claim 1 including [a pair of raising and lowering means,] means for controlling said raising and lowering means located on one of said pair and means for controlling said propelling means located on said other of said pair.

10. A device as defined in Claim 5 including means for alternately, periodically propelling each of said propelling means in the same general direction.

[11. A device comprising:

(a) means for raising and lowering a person from a first substantially seated position to a second substantially standing position, (b) mechanical means for propelling said raising and lowering means, and (c) means for supporting the buttocks.]

12. A device comprising:

(a) means for raising and lowering a person from a first substantially seated position to a second substantially standing position, (b) mechanical means for propelling said raising and lowering means, and (c) means *moveable together with said raising and lowering means* for bracing a person's knees.

13. A device comprising:

(a) means for raising and lowering a person from a first substantially seated position to a second substantially standing position, (b) mechanical means for propelling said raising and lowering means, and (c) means for moving said propelling means over a cushion of air between said propelling means and a surface.

14. A device as claimed in Claim 1 wherein each of said power means includes an electric motor.

*15. A device as defined in Claim 1 wherein said body members each include a pair of telescoping body sections.*

*16. A device as claimed in Claim 5 including means for alternately moving said pair of supporting means.*

*17. A device as defined in Claim 12 including means for facilitating the movement of the device along a surface.*

*18. A device as defined in Claim 17 wherein said facilitating means includes a plurality of wheels.*

*19. A device as defined in Claim 5 including means for providing a walking-like gait for said pair of propelling means.*

*20. A device comprising:*

*(a) means for raising and lowering a person from a first substantially seated position to a second substantially standing position, said raising and lowering means including a pair of body members having power means therein,*

*(b) substantially rigid means for bracing a person's knees, and*

*(c) mechanical means for propelling said device along a surface.*

*21. A device comprising:*

*(a) a buttocks supporting means,*

*(b) means for raising and lowering a person supported on said buttocks supporting means from a first substantially seated position to a second substantially standing position, said raising and lowering means including a pair of substantially vertical body members, said body members each having a pair of telescoping portions, said buttocks supporting means being positioned between a telescoping portion of each body member,*

*(c) means for restraining the person's legs to prevent bending at the knee, and*

*(d) mechanical means including a plurality of wheels for propelling said device along a surface.*

References Cited

The following references, cited by the Examiner, are of record in the patented file of this patent or the original patent.

UNITED STATES PATENTS

| | | | |
|---|---|---|---|
| 2,227,526 | 1/1941 | Wilson | 128—25 |
| 2,871,915 | 2/1959 | Hogan | 128—25 X |
| 3,379,450 | 4/1968 | Jones et al. | 280—36 |
| 3,023,048 | 2/1962 | Barton | 297—330 |
| 3,157,188 | 11/1964 | Farnham | 135—50 |
| 3,216,518 | 11/1965 | Beardsley | 180—7 |

LAWRENCE W. TRAPP, Primary Examiner

U.S. Cl. X.R.

180—119